United States Patent Office

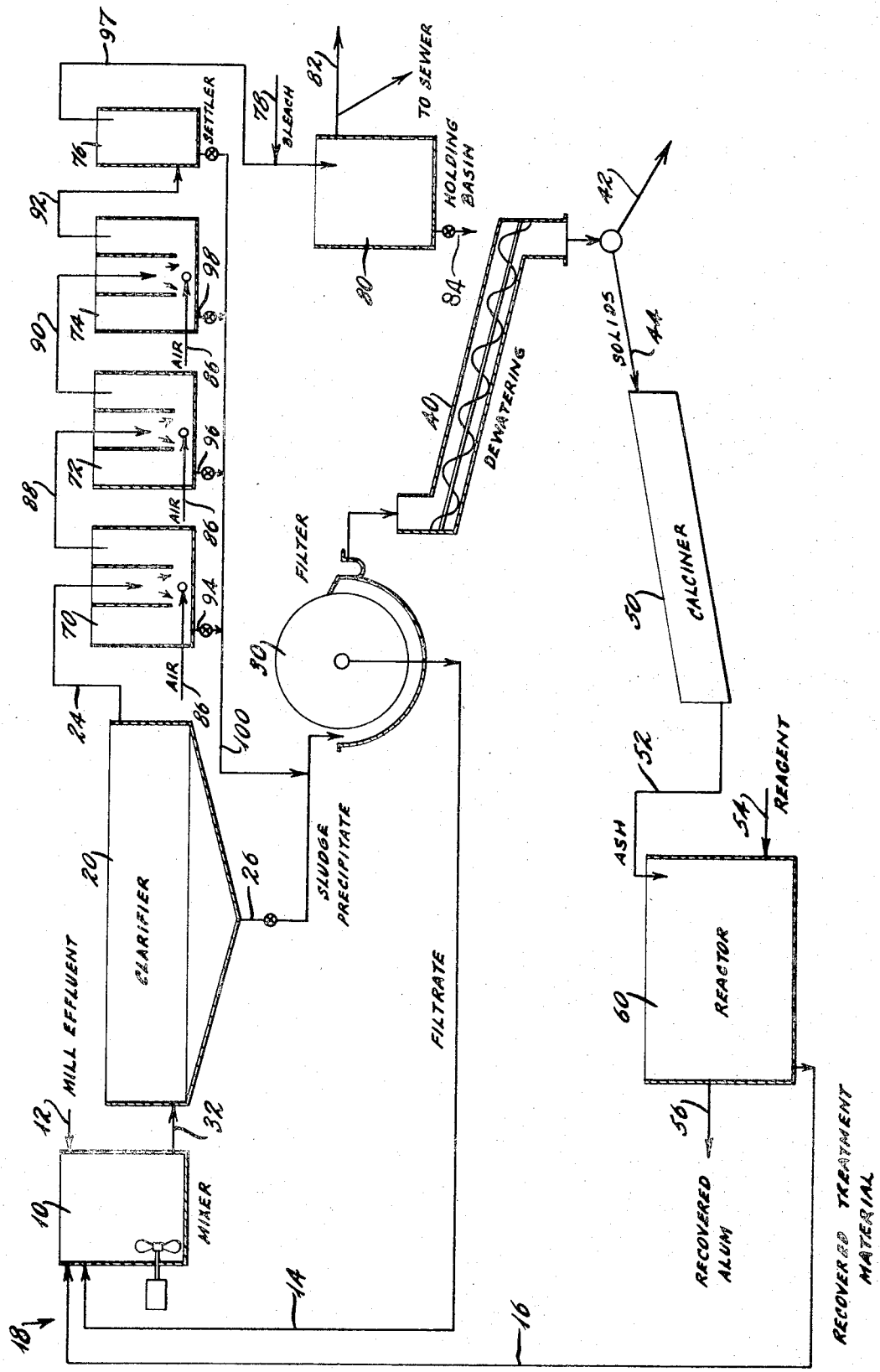

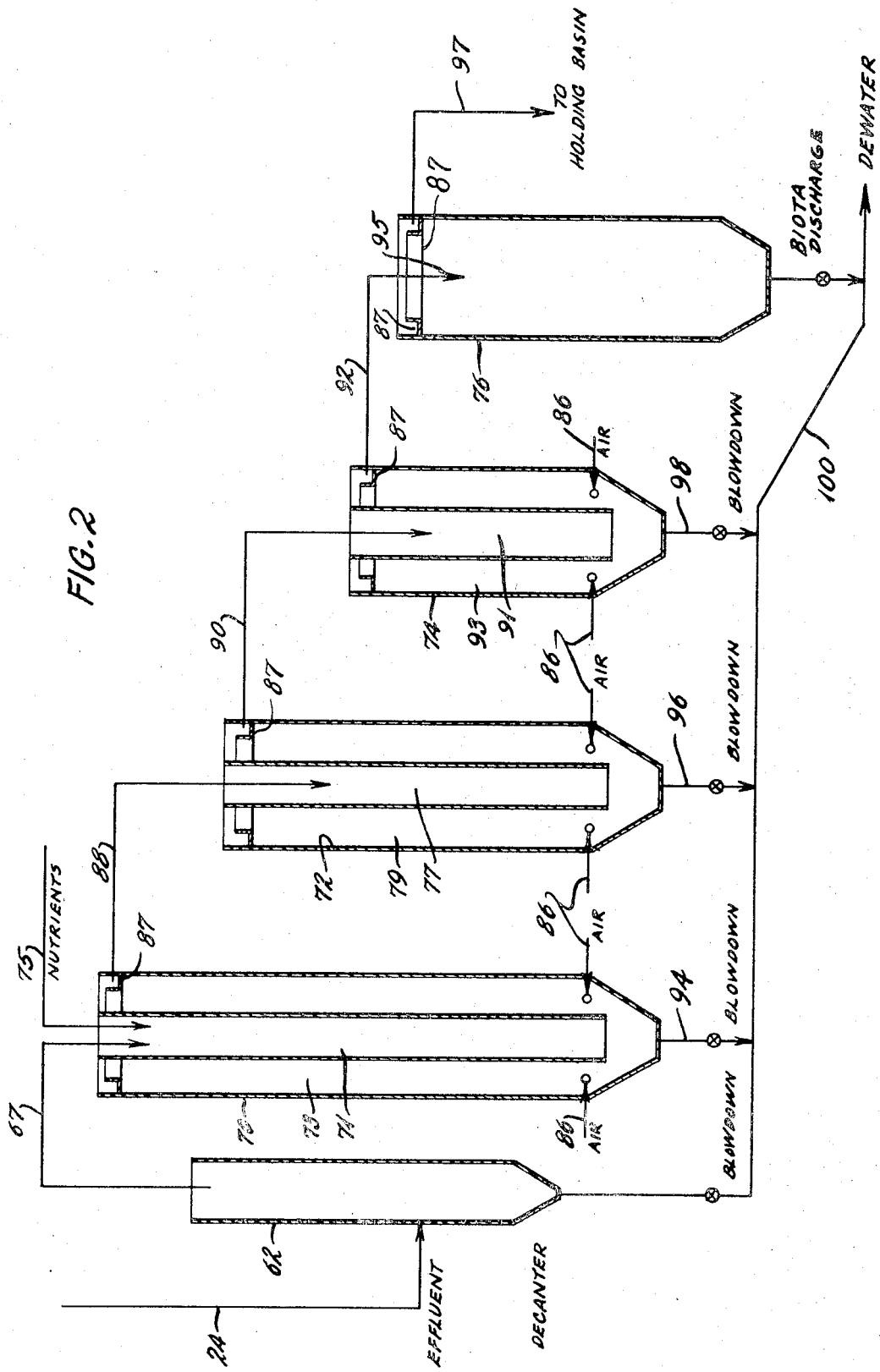

3,740,363
Patented June 19, 1973

3,740,363
EFFLUENT TREATMENT PROCESSES
Robert R. Fuller, Tuscaloosa, Ala., assignor to Gulf States Paper Corporation, Tuscaloosa, Ala.
Continuation-in-part of application Ser. No. 641,304, May 25, 1967. This application Oct. 27, 1969, Ser. No. 869,784
Int. Cl. C02c 5/10
U.S. Cl. 210—18         8 Claims

ABSTRACT OF THE DISCLOSURE

A waste effluent treatment which involves contacting a waste effluent, e.g., pulp and paper mill effluent, with a metal salt reagent, preferably alum mud. Treatment decolorizes the effluent and precipitates a substantial portion of the organic content. The precipitate and sludge is dewatered, then calcined, and the reagent regenerated from the ash for use again in a cyclic process. The decolorized effluent is bio-oxidized, preferably in a multistage bio-oxidation sequence and is now sufficiently pure for recycle purposes. The purified effluent may be bleached prior to recycle.

---

This application is a continuation-in-part of Ser. No. 641,304 filed May 25, 1967, now U.S. Pat. No. 3,627,679.

The present invention relates to a method for treating waste effluent streams. In a preferred embodiment, this invention relates to a procedure for purifying the liquid effluent from pulp and paper mills to a level which permits recycle of the process water.

Conventionally, wood pulp is cooked or digested to solubilize the non-cellulosic fractions of the wood pulp liberating the cellulose fibers therefrom for later recovery in a relatively pure state. In consequence, several waste effluent streams issue from a pulp and paper mill, among the most noteworthy of which are the strong solution directly from the digester (containing the solubilized lignin and the cooking chemicals), and the tailing streams from the various washing operations carried out on the liberated cellulose fibers. Nowadays, the digester effluent is treated, e.g., by concentrating and burning the concentrate, to recover the cooking chemical. However, less is done to the various tailings solutions, even though these effluent streams constitute serious disposal problems to the plant operators and to the surrounding communities.

The problem of effluent disposal is complicated, moreover, by the extreme diversity of materials present in pulp and paper mill effluents. They contain, among other things, sugars, lignin compounds, cellulose fibers, cooking chemicals. If a bleaching operation is part of the pulp treatment, the effluent may contain free acid like hydrochloric acid, chlorinated lignin compounds, and sometimes free base like sodium hydroxide. The paper fabrication portion of an integrated pulp and paper mill contributes ingredients to the effluent stream, e.g., dyes, aluminum oxide, sodium sulphate, starch, clay, rosin, vegetable gums and synthetic resins. Still additional ingredients are added to the effluent from the need to treat incoming water e.g., alum, silicates. Lastly, the combined effluent normally includes yard dirt, surface drainage waters, even sanitary sewage. As is apparent from the above brief description, the waste effluent from a paper manufacturing complex is a large volume, low concentration mixture of many diverse materials, some dissolved, some suspended. A mill producing 500 tons per day of finished paper products may have a waste effluent volume of about 20,000,000 gallons per day.

To some extent the problems of effluent treatment are mare more difficult because the composition of the effluent from each plant is somewhat unique. There are mills which only convert purchased fibers; other mills produce only unbleached paper, or all bleached paper, or mixtures of the two; then there are mills which produce various specially coated papers.

The need for biologic treatment of pulp and paper mill effluent has forced the art to include effluent disposal systems of greater or lesser efficacy as an almost integral part of a pulp and paper mill complex. Hopefully, the effluent treatment systems operate to remove suspended solids and to reduce the bio-chemical oxygen demand to levels acceptable for discharging the treated effluent into streams. Existing systems do not, however, solve the problems raised by the presence of color bodies in the effluent. Indeed, under ideal treatment conditions, the ultimate treated effluent may be potable, but highly colored, even almost black. Esthetic considerations alone require the art to face up to effluent color as a serious problem. In addition, color in the effluent prevents recycle of treated effluent back into the pulp and paper mill.

Research work by the National Council of Stream Improvement has shown that the coloring matter in paper and pulp mill effluent is partly in true solution. Only that portion of the coloring matter colloidally suspended can be coagulated and removed by coagulation procedures, explaining thereby, perhaps, the failure of conventional coagulation techniques to clear up effluent color. Copending application Ser. No. 641,304, filed May 25, 1967, discloses a color removal system which substantially reduces effluent color. It has now been found that the same treatment also reduces the solids loading and BOD (biochemical oxygen demand) sufficiently to permit a facile effluent purification adequate for recycling purified effluent back to process water.

The principal object of the present invention is to provide a technique which purifies waste effluent to a level permitting recycle of the effluent.

A further object of the present invention is to provide a color removing system wherein the waste product of the alumina industry may be employed in whole or in part as a reagent for color removal from paper and pulp mill effluent and the reagent recovered for reuse, and the treated effluent recovered for reuse in the mill.

Further objects and advantages of the present invention will become apparent from the description thereof which follows:

Briefly stated, the procedure of this invention involves admixing a predetermined quantity of color precipitating reagent to the waste effluent stream, followed by separation of the resulting precipitate from the now decolorized, improved effluent. The effluent is discharged to further treatment in a multi-stage bio-oxidation system which purifies the effluent to a purity level permitting recycle as process water. The precipitated organic materials, e.g. color bodies, and sludge, are further dewatered, then discarded. In a preferred mode of the invention, dewatered precipitate both from the decolorizing and the bio-oxidation steps is calcined to an inorganic ash, and the ash treated to regenerate color precipitating reagent for subsequent use on fresh effluent.

Advantageously, the color precipitating reagent seems to carry down substantial quantities of organic matter, so much that the detailed practice of the decolorizing procedure is applicable to wastes whose color problems may be relatively minor, but where the organic loading is inordinately high, including, for example, sanitary sewage, cannery wastes, starch plant wastes. Thus, even where color is not a principal problem the color precipitating step forms part of the overall procedure of the present invention.

It has been discovered that numerous metal salts will precipitate color bodies and other organic matter from waste effluents. The precipitating property is not universal. Some salts have no such affects; no consistent pattern means to exist. In particular, however, aluminum and iron salts are effective as precipitants and, moreover, offer promise for use in cyclic systems; they are preferred materials. The other metal salts which have been found to precipitate color bodies in waste effluent streams are subject to certain disadvantages, such as their expense, e.g., zinc acetate, or are difficult to recover. Lead acetate is an example of an effective salt unsuitable as a practical matter for the procedure of the present invention. Actully, even iron, e.g., iron sulfate, is subject to certain disadvantages because reaction with tannins (if part of the effluent) creates a black material (like ink). At times, then, iron could impart a dark tinge all its own to the effluent. Certain metal salts are only partly effective. Magnesium sulfate and barium chloride, for example, precipitate but do not produce good effluent color, nor do sulfuric or hydrochloric acids. Where a waste stream containing a melt salt too costly for normal use exists in close proximity to an effluent from which it will precipitate color and other organics, it is contemplated this waste stream would be used and the metal recovered. Salts of copper, zinc, lead, etc., either in waste streams or in a state not suitable for their intended use, might be utilized advantageously.

Regardless of which metal salt is employed, the waste effluent discharged from the decolorizing step has considerably less organic matter than the initial effluent and is already pH adjusted (e.g. pH-5) to a level suitable for bio-oxidation. In the instance of effluent from pulp and paper mills a color of about 50 is attained. However, this good color level cannot be retained unless care is taken during the bio-oxidation procedure. In test studies the bio-oxidation caused a pH rise from pH-5 to pH-7.0–7.5. The yellowness of the effluent increased to a color of 100 or more. The biota were largely sphaerotilus which formed stringy colonies of a light brown color during the bio-oxidation. Standing in water with little air therein turned the colonies black. Under agitation the black biota mass disperses and blackens the effluent of the bio-oxidation. Even continued contact with fresh biota, that is the brown colonies, turns the effluent to a light brown and causes some increase in the BOD thereof. For best results therefore, black biota should be avoided, the biota should be separated as rapidly as possible and a minimum, even no recycle of biota back to the bio-oxidation is desirable. If an excess of oxygen is present in the effluent from which the biota is being separated, the biota is a dark brown and color does not seem to extract therefrom.

A multi-stage bio-oxidation system is highly efficient and avoids introduction of color (from the biota) into the effluent. As much as 98% of the initial BOD can be removed from the waste effluent by decolorizing and multi-stage bio-oxidation. Preferably, each stage operates with excess oxygen introduced thereinto.

According to one preferred mode of this invention, three oxygenated stages are provided:

(1) A first stage where available food is high. This is a growth stage where biota multiplies in response to the food supply. Experimentally, a reduction of 70% in BOD was obtained here, using here about 50% of the total dwell time in the bio-oxidation system.

(2) A second stage where the quantity of biota exceeds the food supply. The colonies grow in size and start dying off for lack of food. About 80% of the BOD of the feed to this stage is removed. Preferably about 34% of the total dwell time is used in the second stage.

(3) A third stage where the food remaining is meager relative to the biota present. Large colonies form and settle rapidly. About 50% of the BOD in the feed is removed here. Preferably about 15% of the dwell time is used in the third stage.

Each stage should be equipped with suitable air supplies near the bottom thereof. Also, each stage should have a bottom blow-down arrangement to remove any material (e.g. biota) which settles down.

From the third stage the effluent flows to a quiescent decanter to separate the biota therefrom. The sludge from the decanter as well as the sludge recovered from the bottom of each separator may be joined to the solids material from the decolorizing step.

The effluent from the decanter, in the instance of effluent from a pulp and paper mill is slightly off color, e.g., yellow with a color below 200. As is, it may be recycled for some operations, such as unbleached paper production. However, bleaching, e.g., oxidizing, the effluent, e.g., with hydrogen peroxide, removes most of the color and permits recycle of effluent to most paper making operations. A small amount of precipitate (often bright orange) is formed in bleaching the effluent. Tests indicate that the final bleached effluent has virtually the same analysis as plant incoming water, with the exception of sodium sulfate content. The sodium sulfate seems to build up, e.g., 800–1,000 p.p.m., and requires that some of the effluent be discharged to prevent build up to excessive levels.

Reference is now made to the attached drawing wherein:

FIG. 1 is a flow sheet of the effluent treating process as a whole, and

FIG. 2 is a diagrammatic view of a preferred multi-stage bio-chemical oxidation treatment system.

For preferred practice of the present invention, reference is now made to the FIG. 1 flow sheet representation thereof. As shown in the drawing, the effluent stream passes directly from the effluent collection system of a pulp and paper mill complex to mixer coagulator 10, being fed thereto continuously via a feed line 12. Treating reagents either from a recycle, line 16, or a feed point 18, are added to mixer 10. In addition, filtrate recovered from a later sludge dewatering step is passed via line 14 to mixer 10. A preliminary step not shown on the drawing but contemplated for practice of the invention is adjustment (when necessary) of the incoming effluent pH by treatment with an inexpensive acid or base. For best effect, the pH of the entering effluent stream should exceed 6.5 with the preferred pH range being 7–8. When the reagent is an aluminum salt like aluminum chloride, aluminum sulfate, or even alum mud, addition of the reagent reduces the effluent pH. Greatest color reduction seems to occur at about pH 5.0 in mixer 10. However, satisfactory color removal occurs when the effluent-reagent mixture is anywhere in the range of about pH 5.0–6.0.

Often proper effluent pH can be maintained without an adjustment step as such, by appropriate storage and release of various waste streams into the mill effluent. Individual waste streams are acidic or caustic. For example, a highly acidic waste stream is available from the chlorination stage of a bleach plant. In practice, then, the plant operator would segregate out the more acidic and basic waste products for controlled addition to the main effluent stream.

In some instances, it may also be advantageous to separate part or all of the paper machine wet and effluent and use it to replace fresh water going to the water treating plant. The mixture of fresh and machine water would be treated by this process to attain acceptable water for production purposes.

Tests have shown also that the pulp and paper mill effluent as a whole undergoes some pH change on standing and that aging improves color removal. For best color removal results, then, the effluent should be stored 24 hours or more prior to color removal treatment. If the pH of the stored effluent has dropped below about 6.5, the pH should be raised to 6.5 just prior to treatment. When an outside source of alkali must be employed for pH adjustment, sodium aluminate is preferred as being somewhat more advantageous than caustic soda or quick lime.

From mixer coagulator 10, the effluent-reagent-filtrate mixture passes by way of line 32 to clarifier 20, and is there separated. Contact of the sludge bed with the supernatant should not be in excess of 24 hours. Residence time in clarifier 20 is kept brief because a more extended contact between the effluent and the precipitated solids and sludge seems to cause more oxygen consuming materials to redissolve, needlessly increasing thereby the load on subsequent biologic treatment of the effluent.

Clarified and color reduced liquid effluent leaves clarifier 20 through liquid outlet line 24. In the instance of paper and pulp will waste treatment, the clarified effluent normally passes on to the multi-stage treatment system of a bio-oxidation type. The sludge and precipitated color bodies removed from clarifier 20 by outlet line 26 are then dewatered. In the illustrated system sludge line 26 passes the wet solids material to a rotary filter 30. The filtrate removed from sludge solids by filter 30 is recycled back to the mixer 10 via 14. The solids discharged from filter 30 are further dewatered as by a screw press 40, then discharged through line 42.

At this stage, the solids still have considerable moisture and should be dried further, e.g. air dried to a moisture content of about 20%. The final solids product is suitable for a mulch or a soil conditioner; it has a high available organic content and is rich in trace elements. Conceivably, the economics of particular paper and pulp mills may dictate production of a mulch product.

The preferred mode of the invention is operation of a cyclic system as is illustrated in the drawing, wherein the dewatered solids are treated further in order to recover the color coagulating reagent therefrom. Dewatered solids are passed from line 44 to a calciner 50 (which may be a rotary kiln), wherein remaining water is driven off and the organic constituents of the solids burned away, leaving an easily powdered ash. Care should be taken during calcination to substantially remove the organic material without, in the process, fusing the ash. Suitably, the ashing temperature is 700–900° C. The calcined ash is passed through line 52 to a reactor vessel 60 wherein the ash is reacted with whatever chemicals (e.g. sulfuric acid) added via line 54 are necesary to reconstitute the treating reagent which then is recycled via line 16 back to mixer 10.

The cyclic character of the system illustrated in the drawing causes some metal salts present in the mill effluent to be carried down with the precipitate and a sludge and become concentrated in the ash. The concentration may reach a level which justifies their recovery from the ash. Thus, where the waste stream from a water treatment plant or from a paper mill comprises part of the effluent being treated, aluminum compounds from those sources concentrate in the calcined ash. If the effluent treatment reagent is an aluminum compound, e.g. alum mud, the calcined ash will contain more alumina than is required for reagent recycle purposes, generating thereby aluminum sulfate (solution) as a recoverable product which may be removed by line 56. In one representative instance, the aluminum sulfate product so recovered amounts to about 12 pounds per ton of paper produced.

The feasibility of recovering treating reagent and a useful product and the effluent makes the system of the present invention particularly attractive for treatment of paper and pulp mill effluents.

The effluent leaving clarifier 20 by way of line 24 passes into the first stage 70 of a multi-stage bio-oxidation system. Air introduced near the bottom of stage 70 from air line 86 maintains an oxygenated condition for good growth of the biota therein. The effluent passes to second stage 72 via line 88, then to a third stage 74 by way of line 90. Sludge which collects at the bottom of bio-oxidation stage 70 is removed by blow-down line 94 and added to the sludge precipitate via line 100. Sludge blow down from the second stage 72 removed by line 96 and sludge blow down from third stage 74 removed by line 98 are also fed into line 100 for addition to the sludge precipitate. Air is added to the second and third stages 72, 74 of the bio-oxidation via lines 86.

The bio-oxidized effluent passes out of third stage 74 by line 92 into settler 76 where the biota settles from the clear now purified effluent. The biota is removed from the bottom by blow-down line 100. The effluent passes to retention or holding basin 80 by way of line 97. A bleaching agent may be added from line 78 if minimum color is desired for the effluent. The effluent in holding basin may be recycled back to the mill by line 82 with some small portion thereof being sewered to prevent undue build up of dissolved solids like sodium sulfate. Any precipitate collecting in holding basin 80 may periodically be blown down and removed from the bottom at 84.

A preferred three-stage bio-oxidation system is illustrated in FIG. 2 in somewhat greater detail. The effluent passes from line 24 into a decanter 62, then via line 67 into the reactor tower 73 of first stage 70. The effluent and any nutrients (from line 75) are passed into distribution pipe 71 for downflow therethrough to the bottom of the tower 73. Air is introduced (from sparger line 86) to the tower bottom for aerating the effluent. Any sludge collecting on the tower bottom is blown down through outlet line 94. The effluent flows up tower 73, is collected at launder 87 and passes in line 88 to the second stage 72.

In the second stage 72 the effluent enters central distribution pipe 77 for distribution to the bottom of tower 79. Here too air from line 86 aerates the tower and the upflowing effluent is collected at a launder. Sludge collecting on the bottom is blown down via line 96.

Effluent collected in the launder of the second stage is passed via line 90 into the central distribution pipe 91 of the third stage 74. The effluent then flows up in tower 93 aerated by air from line 86. Blow-down line 98 removes sludge from the bottom of tower 93, and the effluent collected by a launder at the tower top passes via line 92, as shown on the drawing, to settler 76. The biota settling there is removed to discharge line 100, which serves also to collect the sludge blown down in the decanter 62 and the bio-oxidation stages. The now purified effluent passes to a holding basin by way of line 97.

While towers 73, 79, 93 are not so shown, they may contain therein a loose packing material (rock, cinder, etc.) to serve as substrate for the biota.

In exemplary terms, a combined decolorized effluent from a pulp and paper mill may have over 97% of its BOD removed, 68% in first stage 70, 26% in second stage 72 and 3% in third stage 74. The effluent is pure enough for recycle to the mill, but may have to be bleached. However, even in conventional bio-oxidation systems, using shallow concrete basins or earthen lagoons, the clarified effluent is purified enough to permit some recycle thereof.

While detailed description of preferred practice of the invention has been posed alone in terms of pulp and paper mills, the invention as a whole is not so limited. Other waste streams, particularly those with relatively high organic loading, are susceptible to substantial improvement by practice of the present invention, even where color removal is not the principal problem, e.g., cannery waste, starch plant residue, even sanitary sewage.

For example, the size press coating operation in a bleached board mill discharges a milky, cloudy effluent containing starches, resins, clays, titanium dioxide, latices, etc. Decolorizing treatment of this effluent, using aluminum or iron salts, e.g., iron sulfate (Ferrisul) provides a clear supernatent having a color comparable to that of tap water and a substantially lower oxygen demand than in the original effluent, along with a precipitate which contains the color bodies, and the suspended material, facilitating bio-oxidation to a purity level which permits recycle of the effluent.

Aluminum salts have been identified above as preferred reagents for effecting decolorizing precipitation according to practice of this invention. Particularly preferred is alum mud, i.e., the solids fraction of the effluent from an alum plant. The alum mud may be used directly in its original state as a mixture of solids and liquids, or in the form of air dried mud solids. While alum mud is a somewhat variable material whose exact composition varies from plant to plant, even from day to day, alum mud from several sources has been found most satisfactory. Advantageously, use of alum mud permits employment of a waste effluent from one industry to clean up, so to speak, the waste effluent from a second industry. However, an alum plant adjacent to a pulp and paper complex does not produce enough effluent to decolorize the mill effluent, and all installations having treatable effluents do not have alum plants in close proximity. What effluent is available could be utilized.

It has been found that the precipitation of color and other materials is best effected by a reagent comprising the finely divided spent ore from which the metal salt was extracted, and the metal salt in solution, i.e., a suspension of the finely divided spent ore in the salt solution. An example of this is the mud (spent ore) discharged from the production of alum. The extracted ore particle still has aluminum ions attached to it, and the entire exposed particle is saturated with alum. This reactive surface promotes the interaction to precipitate the color bodies and other organics; promotes a rapid agglomeration; produces rapid, dense settling; and a low volume, dense sludge bed.

Calcining the precipitated mixture of color bodies, organics, including the biota collected from the bio-oxidation, inorganics, and spent ore particles gives an ash composed of the metal oxide, the ore particles, and other materials from the effluent, quite similar to the original ore. The ash is extractable to reproduce the precipitating reagent. Where aluminum salts are used for color precipitation, extraction the ash with sulfuric acid produces alum. Extracting with other acids, or with bases, produces the corresponding aluminum salt.

Alum mud would ordinarily be used to start the system. Conceivably, the system could be started with a metal salt and an inert material. Results by this latter method do not appear to give as good a result.

Typically, the alum mud effluent from commercial production of alumina is a mixture of solids and liquid, in an exemplary instance being 86% liquid by weight. The liquid has dissolved there in some alum and heavy metal salts, being an about 1.2% alum solution. If taken from an earlier washing stage in the alum plant, the liquid has more alum therein, e.g., a 3.8% alum solution pH-3.2 analyzing as 0.64% aluminum oxide, 40 p.p.m. iron, 5 p.p.m. nickel, 5 p.p.m. chromium. The solids (14% by weight) analyze as follows:

| | Screen size |
|---|---|
| Iron (1.2%) | >20 mesh, 6.8%. |
| Silicon (12.0%) | >50 mesh, 41.4%. |
| Titanium (1.2%) | >100 mesh, 19.2%. |
| Niobium (0.12%) | >200 mesh, 10.3%. |
| Aluminum (4.0%) | >325 mesh, 3.4%. |
| Zirconium (1.2%) | <325 mesh, 18.9%. |

For further understanding of the present invention, reference is now made to the following specific examples which illustrate detailed practice thereof and which provide test results pertaining thereto.

EXAMPLE I

Various samples of the effluents from an unbleached kraft mill, and a bleached kraft, coated board mill were secured. Examples of the effluents tried: Total effluent each type mill, pulp mill effluent of unbleached kraft mill, paper mill effluent of unbleached kraft mill, strong waste board mill (pulp mill less beach plant), effluent board mill less strong waste, castic stage bleach plant, etc.

Liter aliquots of these samples were treated with varying quantities of alum mud. Addition of 1 to 5% alum mud precipitates the color bodies from most effluents. The amount of precipitating material required for best results varied with the concentration of precipitatable organics in the effluent sample. Simple reduction of pH to pH 5 was found to be a reliable guide for controlling the alum mud addition. The concentration of black liquor and/or bleach plant caustic effluent in the total effluent influenced the degree of color removal. Chlorination stage effluent, or a low pH mixed effluent, i.e. below pH 4, would not react to give adequate color removal; but addition of lime equivalent to about 1 lb. per 1000 gallons prior to treatment with alum mud gave the color reduction desired in most instances.

EXAMPLE II

Sample of strong waste 6 to 7 pH.

(a) Varying amounts of alum mud were tried, and 1% to 2% was found to give the desired color removal.
(b) Alum mud addition was held constant at 1%, and various dosages of alum tried.
(c) Clay and alum in various ratios were tried.
(d) Alum and sulfuric acid were tried in various ratios.

The best results were obtained with alum mud (a) or alum mud and alum (b).

EXAMPLE III

Various metal salts and acids were tried without regard to quantity on a pulp mill effluent having a pH of 10:

Magnesium nitrate—precipitate—color reduction poor
Lithium chloride—no change
Ferric chloride—excellent precipitate—color reduction, but not good enough
Zinc acetate—excellent precipitate, good color reduction
Magnesium sulfate—precipitate—little color reduction
Aluminum chloride—excellent precipitate, excellent color reduction
Barium chloride—precipitate—little color reduction
Zinc chloride—good precipitate—good color reduction
Cadmium sulfate—good precipitate—color reduction not good enough
Lead acetate—good precipitate—good color reduction
Copper sulfate—good precipitate—good color reduction, but the supernatant is light blue
Calcium nitrate—good precipitate—color reduction not good enough
Sulfuric acid—precipitate—poor color reduction
Hydrochloric acid—precipitate—poor color reduction
Ferrisul—excellent precipitate—excellent color reduction—supernatant tends to have blackish tinge
Activated alum—good precipitate—good color reduction Some of these materials cause no pH reduction, some reduce to pH 6.5 and stop, other such as alum gradually reduce the pH and pH can be used to control the reaction. Acids reduced pH to 3.5 to attain precipitation, which is too low a pH. Some of the salts, e.g. lead, are not compatible with a secondary treatment step. The sludge volume remained at 25 to 35% of the solution after 24 hours settling.

EXAMPLE IV

Effluents from various paper and pulp mill sources were treated with precipitating materials:

(a) Liter aliquots of strong waste: 15 cc. sludge, 50 p.p.m. sulfuric acid, 50 p.p.m. alum. pH 5.9.
(b) 10 cc. sludge and 200 p.p.m. sulfuric acid. pH 5.5.
(c) Total effluent: 10 cc. sludge, 50 p.p.m. alum, 20 p.p.m. sulfuric acid. pH 4.8.
(d) Alum plant effluent from various plants using bauxite ores (alum mud).

Alum alone decolorized the effluent. Depending on the concentration of the effluent, dosage up to 750 p.p.m. was required. From 1 to 6% alum plant effluent effects color reduction with a sludge volume, after 24 hours settling, of 10 to 15%.

Alum plant effluent and sulfuric acid decolorize the effluents. Combinations of alum plant effluent and alum decolorize the effluents. However, best results are at pH 5.5.

In the following examples the organic material present is the loss in weight on ashing the dry solids. M gal.=million gallons.

EXAMPLE V

A liter sample was taken of the total effluent from an integrated bleached kraft board mill. It had the following characteristics: pH 6.6, 5 day BOD 419, oxygen demand 3490 lbs. per M gal., filterable solids 1100 lbs./M gal., total dissolved solids 11,054 lbs./M gal., inorganic dissolved solids (ash) 6339 lbs./M gal., and organic dissolved solids (loss on ignition) 4715 lbs./M gal.

Alum mud was added to the liter sample with mild agitation until the pH dropped to 4.9. Very slow stirring was continued for five minutes. A voluminous floc coagulated almost immediately.

Settling was rapid. The precipitated material was removed, dried, and weighed. This precipitate amounted to 4442 lbs./M gal.

The supernatant had the following characteristics: 5-day BOD 179, oxygen demand 1491 lbs./M gal., total dissolved solids 10,297 lbs./M gal., inorganic dissolved solids 7,914 lbs./M gal., organic dissolved solids 2365 lbs./M gal., and color was clear, slightly yellow. A 57.28% reduction in oxygen demand, a 49.84% reduction in dissolve organics, and a very marked removal of color was attained.

EXAMPLE VI

Integrated bleached board mill effluent. Characteristics: pH 11.7, 5-day BOD 843 p.p.m., oxygen demand 7022 lbs./M gal., filterable solids 1416 lbs./M gal., total dissolved solids 27,231 lbs./M gal., inorganic dissolved solids 13,478 lbs./M gal., organic dissolved solids 13,753 lbs./M gal.

Alum mud was added to a liter sample of this effluent with slow stirring until the pH reached 5.5. Agitation was continued for about five minutes and then stopped. A very voluminous dark precipitate coagulated immediately and settled rapidly. The floc was separated from the supernatant, dried, and weighed. The precipitate amounted to 21,595 lbs./M gal. of effluent treated.

The supernatant had the following characteristics: 5-day BOD 181 p.p.m., oxygen demand 1508 lbs./M gal., total dissolved solids 20,209 lbs./M gal., inorganic dissolved solids 18,925 lbs./M gal., organic dissolved solids 1,284 lbs./M gal., and color was clear, slightly yellow. Reduction in oxygen demand 78.53%, in organics 90.66%, and a major reduction in color.

EXAMPLE VII

Integrated bleached board mill effluent. Characteristics of effluent: pH 6.6, 5-day BOD 255 p.p.m. filterable solids 4291 lbs./M gal., total dissolved solids 14,369 lbs./M gal., inorganic dissolved solids 10,546 lbs./M gal., organic dissolved solids 3823 lbs./M gal., 15-day BOD 369.

One liter of this effluent was treated with 5 ml. of alum mud to pH 4.9 with very slow agitation. It was agitated 5 minutes, and the precipitate allowed to coagulate and settle. The precipitate dried and weighed amounted to 17,620 lbs./M gal.

Characteristics of the supernatent: 5-day BOD 143, 15-day BOD 216 p.p.m., total dissolved solids 14,752 lbs./M gal., inorganic dissolved solids 12,545 lbs./M gal., organic dissolved solids 2207 lbs./M gal. Reduction in oxygen demand—5-day 44.9%, 15-day 35.9%; reduction in organics 42.3%; color reduction excellent.

EXAMPLE VIII

Effluent from the stock preparation system of a hardwood neutral sulfite plant. Characteristics of the effluent: 5-day BOD 2142 p.p.m., oxygen demand 17,136 lbs./M gal., total solids 43,502 lbs./M gal., inorganic solids 19,835 lbs./M gal., organic solids 23,667 lbs./M gal.

A liter of this effluent was treated with sodium aluminate to pH 6, and then with alum mud to pH 5.0 using slow agitation. Agitation was continued for five minutes, and the precipitate allowed to coagulate and settle.

Characteristics of supernatant: 5-day BOD 1304 p.p.m., oxygen demand 10,862 lbs./M gal., total solids 36,794 lbs./M gal., inorganic solids 24,282 lbs./M gal., organic solids 12,512 lbs. per M gal.

Reduction in oxygen demand 5-day 36.55%. Reduction in organics 47.13%, color good.

EXAMPLE IX

Effluent from semi-chemical machine wire pit running hardwood semi-chemical. This effluent had a 5-day BOD of 2098 p.p.m. Oxygen demand 17,476 lbs./M gal.

Sodium aluminate was added to a liter of this effluent to pH 6, and alum mud added to pH 5. This mixture was agitated, then allowed to coagulate and settle.

The supernatant had a 5-day BOD of 1478 p.p.m. Oxygen demand 12,311 lbs./M gal. Reduction in oxygen demand 29.55%.

EXAMPLE X

Effluent discharged to the river from a mechanically aerated lagoon of a plant producing bleached tissue, bleached board, and paper. This was an integrated mill producing its pulp by the sulfate process.

Characteristics of the effluent: 5-day BOD 190 p.p.m., oxygen demand 1583 lbs./M gal., total solids 11,621 lbs./M gal., inorganic solids 7,483 lbs./M gal., organic solids 4139 lbs. per M gal., color—grayish black.

Sodium aluminate was added to a liter of this effluent to pH 7.5, and alum mud added to pH 5 with slow agitation. Agitation was continued for five minutes, and the precipitate allowed to coagulate and settle.

Characteristics of supernatant: 5-day BOD 71 p.p.m., oxygen demand 568 lbs./M gal., total solids 10,064 lbs./M gal., inorganic solids 9,013 lbs./M gal., organic solids 1051 lbs. per M gal., color—comparable to tap water.

Reduction in 5-day BOD 64.12%, reduction in organics 74.6%, removal of color—complete, effluent comparable to tap water.

EXAMPLE XI

The strong waste from the pulp mill of a bleach kraft coated board mill was treated for a two-day period. Liquid 50% alum was metered into the effluent flow just ahead of the pump moving the effluent to a storage lagoon. Airdry alum mud solids were fed at an approximate rate at the same point. The effluent at the start of the trial had: an APHA color of 2500, a COD of 960 p.p.m., and a 5-day BOD of 1080 p.p.m. The effluent flow rate varied from 1.6 to 2.3 million gallons per day. pH was recorded continuously and also checked every thirty minutes. Samples were taken hourly of the treated effluent. Settling, precipitate (sludge) volume, pH, COD, and color were determined.

Phase 1: Add—12.5 lbs. air dry mud solids per minute and control treated pH in the range 5.0 to 5.5. Input pH 11. Alum feed rate 2.6 to 2.8 g.p.m.

Treated effluent: pH, 5.2, sludge volume after two hours 25 centimeters, color 120 and COD 450 p.p.m.

Phase 2: Added 8 lbs. air dry mud solids per minute. Alum feed rate 2.1 to 2.8 g.p.m.

Treated effluent: pH 4.9 to 5.2, sludge volume after two hours 24 to 29 centimeters, color 120 to 150, and COD 430 to 520 p.p.m.

Phase 3: Added 6 lbs., air dry mud solids per minute. Alum feed rate 1.7 to 2.8 g.p.m.

Treated effluent: pH 5.1 to 5.6, sludge volume after two hours 23.8 to 26.5 centimeters, color 100 to 200, and COD 440 to 520 p.p.m.

Phase 4: Added 6 lbs., air dry mud solids per minute. Raised the pH range aim point to 6.0–6.5. Alum feed rate 2.0 g.p.m.

Treated effluent: pH 6.3, sludge volume after two hours 28.6 centimeters, color 1000, and COD 620 p.p.m.

Phase 5: Diverted caustic stage effluent from bleach plant into strong waste flow. Kept air dry mud solids feed at 6 lbs./minute.

| pH | Alum added, g.p.m. | Color | COD, p.p.m. |
| --- | --- | --- | --- |
| 5.2 | 3.7 | 375 | 360 |
| 4.7 | 2.8 | 625 | 400 |
| 4.9 | 3.4 | 250 | 330 |

Sludge volume after two hours 28 centimeters. 5-day BOD 555 p.p.m.

Phase 6: Repeated phase 3.

Treated effluent: pH 5.2, sludge volume after two hours 25.5 centimeters, color 100, and COD 480 p.p.m.

Phase 7: Added alum only to pH 5.0 to 5.5 Alum usage 2.3 to 2.7 g.p.m.

Treated effluent: pH 4.7 to 5.1, color 150 to 250, and COD 420 to 570 p.p.m.

During this work part of the alum was replaced by sulfuric acid. Acid addition was in the range of 0.1 to 0.4 g.p.m. of 66° Bé. acid. End results were not changed.

EXAMPLE XII

The precipitates from laboratory and from Example XI were filtered from the supernatant, dried at 105° C., ashed in a muffle furnace, and the ash extracted with sulfuric acid. A typical analysis of these precipitates and extractions was:

Heat value dry material _____ B.t.u.__ 6777
Ash content dry material _____ percent__ 37.77
Aluminum oxide content of ash _____ do____ 35.5
Easily convertible oxide of ash _____ do____ 34.7
Recovery of $Al_2O_3$ present _____ do____ 97.75

EXAMPLE XIII

Effluent from an unbleached kraft pulp and paper mill producing bag and wrapping papers, including the effluent from evaporator barometric condensers.

Characteristics of the effluent: pH 8.2 5-day BOD 613 p.p.m., oxygen demand 5106 lbs./M gal., total solids 13,428 lbs. per M gal., inorganic solids 6239 lbs./M gal., organic solids 7552 lbs./M gal.

A liter aliquot of this effluent was treated with 15 cc. alum mud with slow agitation. Agitation was continued for five minutes, and the precipitate allowed to coagulate and settle.

Characteristics of the supernatant: pH 4.9, 5-day BOD 448 p.p.m., oxygen 3732 lbs./M gal., total solids 10,371 lbs./M gal., inorganic solids 7505 lbs./M gal., organic solids 5198 lbs./M gal., color—equivalent to tap water.

EXAMPLE XIV

Effluent unbleached kraft paper machine room containing screen room effluent. Characteristics of effluent: pH 6.9–7.0, 5-day BOD 182 p.p.m., oxygen demand 1516 lbs./M gal., total solids 5269 lbs./M gal.

A liter aliquot of this effluent was treated with alum mud to pH 5.5 with slow agitation. Agitation was continued for five minutes, and the precipitate allowed to coagulate and settle.

Characteristics of supernatant: pH 5.5, 5-day BOD 94, oxygen demand 783 lbs./M gal., color—equivalent to tap water.

EXAMPLE XV

Paper mill effluent of unbleached kraft mill. Characteristics: pH 6.9–7.0, 5-day BOD 165 p.p.m., oxygen demand 1375 lbs./M gal., total solids, 6,153 lbs./M gal., inorganic solids 3496 lbs./M gal., organic dissolved solids 2657 lbs./M gal.

A liter aliquot of this effluent was treated with 10 ml. of alum mud with slow agitation. Agitation was continued for 5 minutes, and the precipitate allowed to coagulate and settle.

Characteristics of the supernatant: pH 5.5, 5-day BOD 112 p.p.m. oxygen demand 937 lbs./M gal., total dissolved solids 6053 lbs./M gal., inorganic dissolved solids 4081 lbs./M gal., organic dissolved solids 1972 lbs./M gal., color—equivalent to tap water.

EXAMPLE XVI

Paper mill effluent of an unbleached kraft mill containing screen room effluent. Characteristics of effluent: pH 6.9–7.0, 5-day BOD 165 p.p.m., oxygen demand 1375 lbs./M gal., total solids, 6,153 lbs.

500 ml. of this effluent were mixed with 500 ml. of raw river water input to the mill. This mixture had a 5-day BOD of 55 p.p.m., oxygen demand 458 lbs./M gal., pH 6.8.

The mixture was treated with sodium aluminate to adjust pH to 7.0. Alum mud was added to pH 6.0 with slow agitation. Agitation was continued for five minutes, and the precipitate allowed to coagulate and settle.

A clear supernatant was obtained, the color equivalent to tap water. BOD of supernatant 30 p.p.m.

EXAMPLE XVII

Mixed effluent from a bleached coated board mill. Characteristics of effluent: pH 9.9, 5-day BOD 557 p.p.m., oxygen demand 4640 lbs./M gal., total dissolved solids 15,852 lbs./M gal., inorganic solids 8763 lbs./M gal., organic solids 7089 lbs./M gal.

A liter aliquot of this effluent was treated with alum mud to pH 5.5 with slow agitation. Agitation was continued for five minutes, and the precipitate allowed to coagulate and settle.

Characteristics of the supernatant: pH 5.0, 5-day BOD 246 p.p.m., oxygen demand 2048 lbs./M gal. Total solids 13,461 lbs. per M gal., inorganic 9396 lbs./M gal., organic dissolved solids 4065 lbs./M gal., color—good—light yellow.

The supernatant was seeded with sewage sludge, adjusted with ammonia and phosphoric acid, and aerated for three days.

At the end of the three days, the supernatant was filtered and a BOD determination made on the filtrate. 5-day BOD 21.8 p.p.m., oxygen demand 181 lbs./M gal. Overall reduction in BOD 95.5%. No additional color removal occurred in bio-oxidation.

EXAMPLE XVIII

The total effluent of a coated bleached board mill was treated over a period of two days with alum and air dried alum mud solids. Air dry alum mud solids were fed to the intake of the pump moving the effluent to an Eimco clarifier. Liquid alum was fed in varying dosages into the pump intake.

Underflow from the clarifier went to an Eimco belt filter. Solids from the filter were moved by a front end loader to separate piles. These piles were randomly sampled. Aliquots of the large sample were given a preliminary ashing in large evaporating dishes over a bunsen burner, and the ashing completed in a muffle furnace.

Characteristics:

TABULATED DATA I

| Sludge sample | Percent moisture [1] | Percent ash [2] at ashing temperature of— | | |
|---|---|---|---|---|
| | | 700° C. | 800° C. | 900° C |
| A. First day operation | 51.2 | 23.2 | 21.6 | 19.5 |
| B. Total effluent 2nd day | 51.2 | 22.4 | 25.5 | 28.7 |
| C. Morning of 3rd day | 50.5 | 30.9 | 22.8 | 23.6 |

U. V. SPECTROSCOPY [3]—ASH ANALYSIS

[Ash prepared at 900° C. from sludge of 2nd day qualitative estimates]

| Element | A | B | C |
|---|---|---|---|
| Aluminum | 10.0 | 10.0 | 10.0 |
| Calcium | 33.6 | 3.4 | 10.0 |
| Iron | 3.4 | 3.4 | 3.4 |
| Magnesium | 1.0 | 0.3 | 1.0 |
| Manganese | 0.1 | 0.3 | 0.1 |
| Phosphorus | 0.1 | 0.1 | 0.1 |
| Silicon | 10.0 | 10.0 | 10.0 |
| Titanium | 0.1 | 3.4 | 0.3 |
| Zirconium | | 1.0 | 1.0 |

[1] 105° C. to constant weight.
[2] Three hours at 700° C., 800° C., and 900° C. in muffle furnace.
[3] By U.V. Spectroscopy. Other trace metals were found at less than 0.1% but are not shown because of their relative unimportance. Metal contents shown are qualitative estimates expressed as a logarithmic average of a possible range of concentration and therefore offer only an order of magnitude of concentration.

TABULATED DATA II

[Aluminum as $Al_2O_3$ expressed as weight percent of the ash from second day of operation (Sample B)]

| Ashing temperature, ° C. | Percent $Al_2O_3$ | |
|---|---|---|
| | Digestable alumina | Total alumina |
| 700 | 13.7 | 15.4 |
| 800 | 15.9 | 16.3 |
| 900 | 18.5 | 19.2 |

EXAMPLE XIX

A three-stage unit was constructed having a capacity of 63 liters in the first stage, 40.75 liters in the second stage and 18 liters in the third stage. Effluent of various bio-chemical oxygen demand was pumped thru the system at varying rates, and with several types of nutrients over several months. From this work the best conditions were selected.

Proper bio-oxidation of effluent from which the organics and color have been removed by precipitation with a metal salt-suspended ore mixture produced an effluent of light yellow color and low in bio-chemical oxygen demand. More specifically the bio-chemical oxygen demand reduced by 95 to 98 percent, color less than 200, and the effluent contained 5 p.p.m. of oxygen under good operation. Water of this color is satisfactory for unbleached paper production, but not bleached paper production. The residual color can be removed to obtain a color in the range 0 to 10 by treating the effluent with chlorine dioxide, hypochlorites, hydrogen peroxide, and similar oxidizing agents. These oxidizing agents also react with the residual bio-chemical oxygen demand, and as it increases, the amount of oxidizing agent must be increased. When the color was brownish instead of yellow, it was much more difficult to remove the color and more oxidizing agent was required. These oxidizing agents, and in particular hydrogen peroxide, formed a bright orange precipitate in the amount of 5 grams per 20 gallons of effluent. This precipitate analyzed about 50 percent ash, and the ash was high in iron.

I have found this residual color can be removed by activated carbon; however, bacterial slime and algae give trouble through plugging the carbon beds.

Water reclaimed by this total system has the same analysis as the plant incoming water with the exception of sodium sulfate content which rises to the range of 800 to 1,000 p.p.m. requiring some of the water to be sewered to avoid sulfate build-up.

EXAMPLE XX

Liter aliquots of the effluent after bio-oxidation according to the procedure of Example XIX were taken, varying amounts of oxidizing agents added and the color reduction determined. These experiments were repeated over a long period of time. It was found the reaction is slow at the high dilution requiring 24 to 72 hours to attain color removal with varying amounts of chemical required depending on the chemical and the effluent condition. 15 p.p.m. of chlorine dioxide removed the color, and 50 p.p.m. of sodium hypochlorite removed the color. Chlorine dioxide works best at pH 5.5 and the hypochlorites and hydrogen peroxide at neutral or alkaline.

EXAMPLE XXI

A carbon bed was constructed by using three one-inch diameter, four-foot long lengths of glass pipe. These were erected vertically and piped so the effluent could be pumped in series through the simulated towers. Each length of pipe was filled with activated carbon under conditions to give best adsorption. Effluent after bio-oxidation was pumped through the columns. Color was reduced from the area of 200 to zero.

This example shows that it is feasible to remove the residual color and bio-chemical oxygen demand remaining in the effluent after precipitation with the metal salt-spent ore mixture with activated carbon instead of with bio-oxidation and oxidizing agents, although care must be exercised to avoid plugging the carbon with algae growth.

What is claimed is:

1. An effluent treatment procedure which comprises contacting a waste effluent with an aqueous reagent consisting of a mixture of solid and a solution of a metal salt, thereafter clarifying the mixture, separating the effluent and the solids sludge and precipitate, dewatering the separated solids, calcining same to an ash, then treating the ash to reconstitute the metal salt solution and solids reagent, and recycling the reagent for employment on incoming waste effluent, passing the clarified effluent through a bio-oxidation system and recycling so-treated effluent back to the process which produces the waste effluent.

2. The process of claim 1 wherein the sludge product of the bio-oxidation is ashed along with said separated solids.

3. The process of claim 1 wherein the bio-oxidation is effected in a multi-stage bio-oxidation sequence.

4. The process of claim 3 wherein the bio-oxidized effluent is bleached prior to recycle.

5. The process of claim 1 wherein said metal salt is a salt of a metal selected from the group consisting of aluminum, iron and zinc.

6. The process of claim 1 wherein said metal salt and solids reagent is alum mud and the ash is treated with sulfuric acid to reconstitute the alum mud.

7. The process of decolorizing and purifying the waste effluent from paper and pulp mills which comprises treating the waste effluent with an aqueous suspension of alum mud, clarifying the resulting mixture, and separately withdrawing clarified decolorized effluent and solids sludge and precipitate, thereafter bio-oxidizing the clarified effluent and recycling so-treated effluent back to the mill which produced the waste effluent, dewatering the solids sludge and precipitate, the water being recycled back to the decolorizing treatment, calcining and dewatered solids to an ash and treating the ash with sulfuric acid to reconstitute the alum mud reagent for recycle to the treatment.

8. The process of claim 7 wherein the sludge product of bio-oxidation is ashed along with the said solids sludge and precipitate.

(References on following page)

References Cited

UNITED STATES PATENTS

| | | | |
|---|---|---|---|
| 1,197,123 | 9/1916 | Hoover | 210—47 |
| 1,679,777 | 8/1928 | Moberg | 210—52 |
| 3,163,598 | 12/1964 | Yoshihara et al. | 210—47 |
| 3,377,271 | 4/1968 | Cann | 210—45 |
| 3,377,272 | 4/1968 | Cann | 210—45 |

OTHER REFERENCES

Moggio, W. A., Color Removal from Kraft Mill Effluents, Proc. 9th Ind. Waste Conf., Purdue U., 1954, pp. 465–476.

Roberts, J. M. et al., Recovery and Reuse of Alum Sludge at Tampa, Journal AWWA, vol. 52, July 1960, pp. 857–866.

1965 Literature Review, Journal WPCF, vol. 38, June 1966, pp. 890–900 (P.O.S.L.).

Smith, D. R. et al., A Chemical-Physical Wastewater Renovation Process for Kraft Pulp and Paper Wastes, Journal WPCF, September 1968, vol. 40, pp. 1575–1581, apparent effective date of October 1967 (P.O.S.L.).

MICHAEL ROGERS, Primary Examiner

U.S. Cl. X.R.

162—29; 210—45